United States Patent
Hashmi (10) Patent No.: US 11,455,181 B1
(45) Date of Patent: Sep. 27, 2022

(54) CROSS-NETWORK CONNECTOR APPLIANCES

(71) Applicant: Amazon Technologies, Inc., Seattle, WA (US)

(72) Inventor: Omer Hashmi, Chevy Chase, MD (US)

(73) Assignee: Amazon Technologies, Inc., Seattle, WA (US)

( * ) Notice: Subject to any disclaimer, the term of this patent is extended or adjusted under 35 U.S.C. 154(b) by 25 days.

(21) Appl. No.: 14/491,933

(22) Filed: Sep. 19, 2014

(51) Int. Cl.
*H04L 12/46* (2006.01)
*G06F 9/455* (2018.01)
*H04L 41/0803* (2022.01)
*G06F 9/54* (2006.01)
*H04L 67/00* (2022.01)

(52) U.S. Cl.
CPC .......... *G06F 9/45533* (2013.01); *G06F 9/54* (2013.01); *H04L 41/0803* (2013.01); *H04L 67/00* (2013.01)

(58) Field of Classification Search
CPC ............ H01L 2924/0002; H04W 92/02; G06F 3/1415; G06F 9/45533; G06F 9/54; G06F 2009/45562; H04L 41/0803; H04L 67/00; H04L 63/0272
USPC ................. 709/227; 370/254, 401; 714/47.1
See application file for complete search history.

(56) References Cited

U.S. PATENT DOCUMENTS

| | | | | |
|---|---|---|---|---|
| 7,926,054 B2* | 4/2011 | Sonderegger | ....... | G06F 9/45558 718/1 |
| 8,738,972 B1* | 5/2014 | Bakman | ............. | G06F 11/0712 714/47.1 |
| 8,914,406 B1* | 12/2014 | Haugsnes | ........... | H04L 63/1441 382/305 |
| 9,137,102 B1* | 9/2015 | Miller | .................. | H04L 41/0803 |
| 9,154,327 B1* | 10/2015 | Marino | .................. | G06Q 30/04 |
| 9,690,607 B2* | 6/2017 | Richards | ................ | G06F 9/5072 |
| 2007/0171921 A1* | 7/2007 | Wookey | ................ | G06F 3/1415 370/401 |
| 2007/0204166 A1* | 8/2007 | Tome | ................... | H04L 63/0272 713/182 |
| 2008/0015863 A1* | 1/2008 | Agapi | ..................... | G10L 15/22 704/275 |
| 2009/0122722 A1* | 5/2009 | Lin | ...................... | H04L 12/4604 370/254 |
| 2010/0027552 A1* | 2/2010 | Hill | .......................... | G06F 21/53 370/401 |

(Continued)

FOREIGN PATENT DOCUMENTS

KR 20130126569 A * 11/2013
SE WO 2006084957 A1 * 7/2010 ....... H04L 29/12009

*Primary Examiner* — Schquita D Goodwin
(74) *Attorney, Agent, or Firm* — BakerHostetler (57) ABSTRACT

A provider may receive a request to enable communications between applications running on network-computing platforms operated by different providers. A virtual machine image comprising instructions for a network connector appliance may be retrieved, transmitted, and installed on a virtual machine host in the third-party network. The virtual machine image may be selected based on its containing instructions needed to operate within the third-party network. When the instructions are executed, messages transmitted on the third-party network may be transmitted to an endpoint in the central network. Messages received at the endpoint may be forwarded to other network connector appliances.

23 Claims, 7 Drawing Sheets

(56) References Cited

U.S. PATENT DOCUMENTS

| | | | | |
|---|---|---|---|---|
| 2010/0115606 A1* | 5/2010 | Samovskiy | H04L 41/20 | 726/15 |
| 2012/0254353 A1* | 10/2012 | Baba | H04L 45/586 | 709/217 |
| 2013/0086234 A1* | 4/2013 | Salsburg | H04L 12/6418 | 709/223 |
| 2013/0103842 A1* | 4/2013 | Seed | H04L 41/0213 | 709/227 |
| 2013/0239106 A1* | 9/2013 | Srinivasan | G06F 9/5077 | 718/1 |
| 2013/0283364 A1* | 10/2013 | Chang | H04L 49/70 | 726/12 |
| 2014/0059226 A1* | 2/2014 | Messerli | H04L 47/783 | 709/226 |
| 2014/0108665 A1* | 4/2014 | Arora | H04L 67/141 | 709/227 |
| 2014/0207958 A1* | 7/2014 | Tan | H04L 45/42 | 709/227 |
| 2014/0223431 A1* | 8/2014 | Yoshimura | G06F 9/45533 | 718/1 |
| 2014/0334495 A1* | 11/2014 | Stubberfield | H04L 49/354 | 370/401 |
| 2015/0040125 A1* | 2/2015 | Anderson | G06F 9/5011 | 718/1 |
| 2015/0052525 A1* | 2/2015 | Raghu | H04L 67/10 | 718/1 |
| 2015/0113142 A1* | 4/2015 | Adolph | H04L 47/70 | 709/226 |
| 2015/0120818 A1* | 4/2015 | Kim | G06F 9/45558 | 709/203 |
| 2015/0188888 A1* | 7/2015 | Kang | H04L 63/0272 | 726/12 |
| 2015/0244710 A1* | 8/2015 | Koster | G06F 21/53 | 713/171 |
| 2015/0341267 A1* | 11/2015 | Chiba | H04L 45/745 | 370/392 |
| 2015/0365313 A1* | 12/2015 | Chiba | H04L 61/2592 | 370/254 |
| 2015/0365341 A1* | 12/2015 | Mittal | H04L 47/70 | 709/226 |
| 2015/0381568 A1* | 12/2015 | Johnson | H04L 63/0272 | 726/15 |
| 2015/0381596 A1* | 12/2015 | Johnson | H04L 63/0272 | 726/6 |

\* cited by examiner

CROSS-NETWORK CONNECTOR APPLIANCES

BACKGROUND

Consumers of cloud-based computing services may utilize multiple vendors. They may do so for a variety of reasons. In some cases, consumers may wish to avoid vendor lock-in, and accordingly may choose to deploy similar services on cloud computing platforms provided by different vendors. In other cases, certain vendors may provide services that are distinctive in some way. In yet another case, a consumer of cloud-based computing services may wish to migrate from one provider to another, and utilizes both vendors while the migration is in progress.

Regardless of the reason, a consumer of cloud-based computing services may be presented with various challenges when multiple vendors are used. One of these difficulties may involve communication between applications running on different cloud platforms. Functioning of the applications may involve communication between the applications or with various services that may be available in one cloud computing environment but not another. However, enabling communication between applications operating on different cloud computing platforms may present a number of challenges.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Embodiments of the present disclosure may be employed to enable communication between applications operating in network environments operated by different providers. In one embodiment, a network provider may receive a request to enable communication with a third-party network. In response, the embodiment may identify, retrieve, and transmit a virtual machine image that is pre-configured with a network-connector appliance that is configured to operate within the third-party network. When instructions corresponding to the network-connector appliance are executed by a virtual machine host, traffic on the network may be forwarded to the central network.

The term central network may be used herein to refer to a cloud or other network that may receive network traffic transmitted from a third-party network, and that may forward network traffic to a third-party network. A communications endpoint may receive communications from a connector appliance on a third-party network, and may transmit communications to a connector appliance on a third-party network. As used herein, the term communications endpoint may include a module configured to receive and transmit communications.

The term third-party network may be used herein to refer to a cloud or other network operated by a third party. The terms central network and local network may be used in the present disclosure to refer to a network on which various embodiments of the present disclosure may be employed.

The term cloud may include various networks of computing devices. As used herein, the terms cloud and network may be treated as equivalent. A computing device, computing node, virtual machine host, and virtual machine may be described as being "in," "on," or "connected to" a cloud or other network, and may also be viewed as being a component of such a network.

An internetworking component or system may provide communications infrastructure between clouds or other types of networks. A network connector appliance, when activated by executing instructions provided in a virtual machine image, may utilize the internetworking component for communications. A communications channel may be established between the network connector appliance and a communications endpoint on a central network. The network connector appliance, as configured in the virtual machine image, may form a secure communications channel with the endpoint on the central network using the internetworking component. Note that networks linked by an internetworking component or system, such as the Internet, may be considered separate networks. A computing node or other device connected to a first network may be described as being connected to that network, and not a second network, even when the first and second networks are interconnected via the Internet.

Examples of internetworking components include the Internet, intranets, microwave transmissions, satellite transmissions, ad hoc networks, and so on. For example, the Internet might function as the internetworking component in an application of various embodiments that involves establishing communications between two Internet-based network providers. In another case, two networks might be temporarily linked by a satellite uplink and downlink. Embodiments of the present disclosure might be employed to conveniently deploy a temporary communications link between the two networks.

Figure 1:
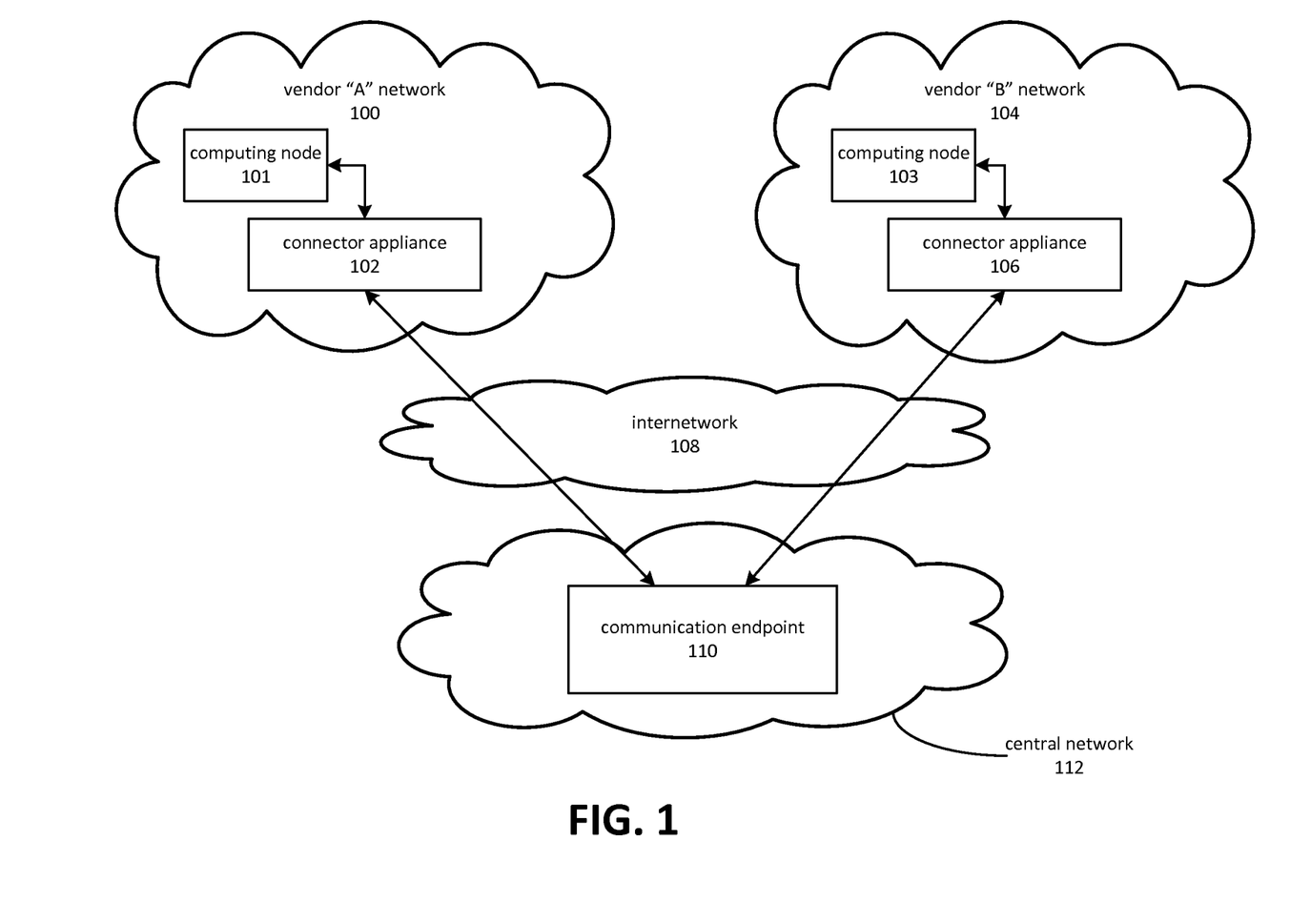
FIG. 1 is a block diagram depicting an embodiment of a system for cross-network communication.

FIG. 1 is a block diagram depicting an embodiment of a system for cross-network communication. FIG. 1 depicts, for illustrative purposes, a scenario in which a process operating on computing node 101 may wish to communicate with a process operating on computing node 103. The scenario further involves computing node 101 being connected to vendor "A" network 100, and computing node 103 being connected to vendor "B" network 104. The term network may include mechanisms for interconnecting computing nodes, and may include wired or wireless communications channels, bridges, routers, firewalls, and so on.

Communication between a process operating on computing node 101 and a process operating on computing node 103 may be enabled using a deployment mechanism provided by a process operating within central network 112. A client of central network 112 may request that communication be enabled between vendor "A" network 100 and vendor "B" network 104. A process operating within central network 112 may then initiate deployment operations to enable operation of connector appliance 102 in vendor "A" network 100 and connector appliance 106 in vendor "B" network 104.

Once activated, connector appliance 102 may receive or intercept traffic on vendor "A" network 100 and forward the traffic to a communications endpoint 110 on central network 112. The traffic may be forwarded via an internetwork 108, which may include the Internet or some other communications medium. Embodiments may form a secure communications channel between connector appliance 102 and communications endpoint 110. In some embodiments, the secure communication channel may involve transmission of Internet Protocol Security ("IPSec") messages, establishment of a virtual private network, and so forth.

In a similar fashion, connector appliance 106 may, upon activation, receive or intercept traffic on vendor "B" network 104 and forward the traffic to communications endpoint 110. Communications endpoint 110 may, in response to receiving traffic from vendor "B" network 104, forward the traffic to connector appliance 102 on vendor "A" network 100. Connector appliance 102 may then forward the traffic to computing node 101. A reverse process may be employed to transmit traffic from computing node 101 to computing node 103.

Figure 2A:
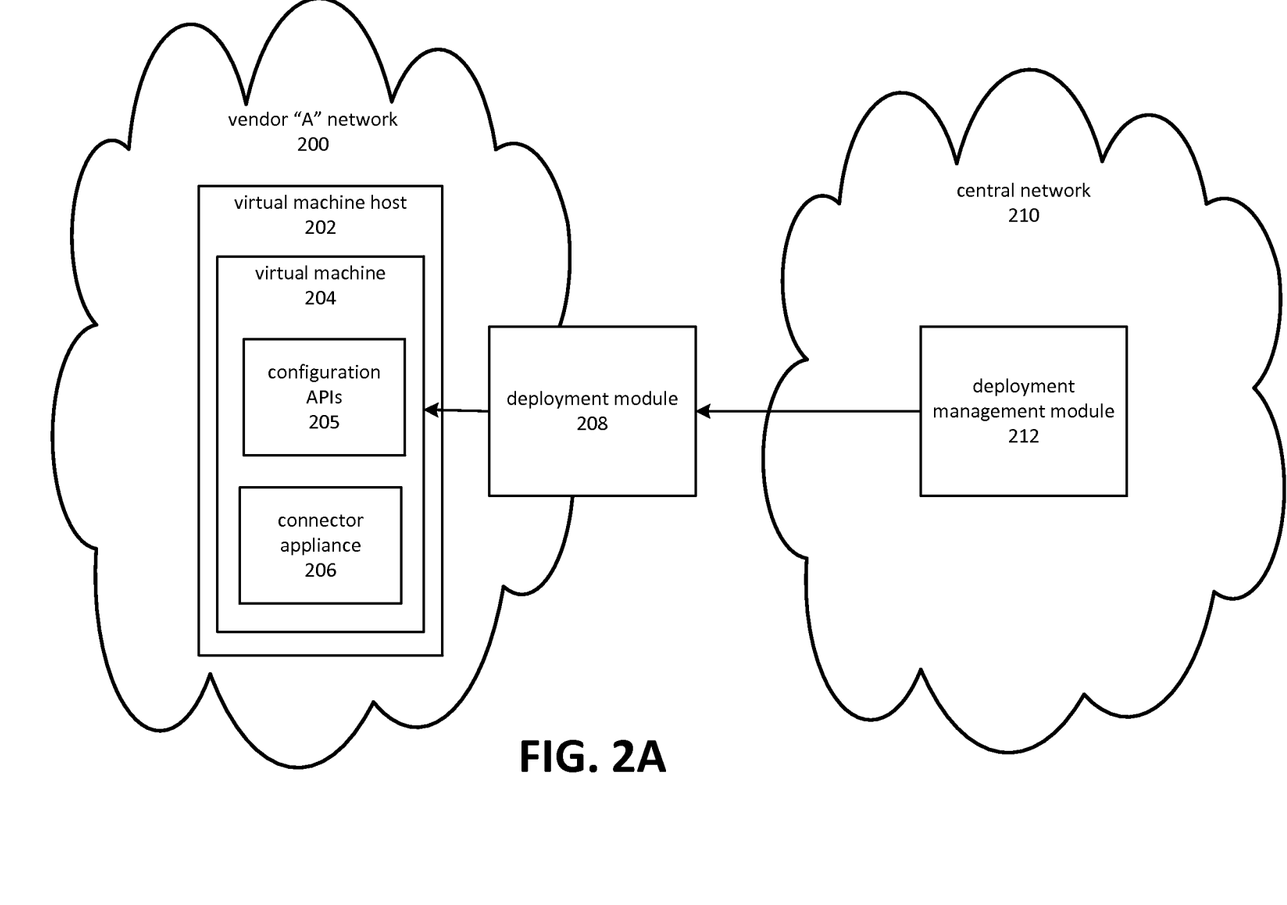
FIG. 2A is a block diagram depicting an example embodiment of a process for deploying an appliance to a network operated by a third party.

FIG. 2A is a block diagram depicting an example embodiment of a process for deploying an appliance to a network operated by a third party. FIG. 2A depicts, for illustrative purposes, a vendor "A" network 200 receiving and enabling a connector appliance 206.

A central network 210 may include a process for receiving a request to enable communication with a process operating on vendor "A" network 200. Embodiments may, for example, receive such a request at a deployment management module 212. In response to receiving the request, deployment management module 212 may retrieve a virtual machine image compatible with virtual machine host 202. The virtual machine image may comprise instructions for performing operations related to connector appliance 206. A deployment management module 212 may interact with a deployment module 208 associated with vendor "A" network 200. The interaction may comprise requesting and receiving information that indicates capabilities and requirements of virtual machine host 202. Based on this information, deployment management module 212 may retrieve an appropriate image from a storage device, not shown, that is connected to central network 210.

Deployment module 208 may comprise instructions for receiving virtual machine images and activating them on virtual machine host 202. For example, deployment management module 212 may transmit a virtual machine image to deployment module 208, where it may then be activated as virtual machine 204 on virtual machine host 202. When activated, instructions in the virtual machine image may be executed. The instructions may comprise those pertaining to the operations performed by connector appliance 206. The operations of a deployment management module may be said to cause instructions corresponding to the operation of a connector appliance 206 to become executable on virtual machine 204, at least because deployment management module 212 may cause the instructions to be installed on virtual machine 204, may supply a virtual machine image comprising the instructions, and so on.

Deployment module 208 may, in some cases, be accessible to users via a public network such as the Internet. Deployment module 208 may in some cases be a forward-facing API that may be invoked via a public network such as the Internet. Deployment module 208 may, in turn, invoke various configuration APIs 205 that are reachable within vendor "A" network. Deployment module 208 may, for example, comprise user interface elements or programmatic interfaces that allow for users of vendor "A" network 250 to deploy new virtual machines or new virtual networks.

Figure 2B:
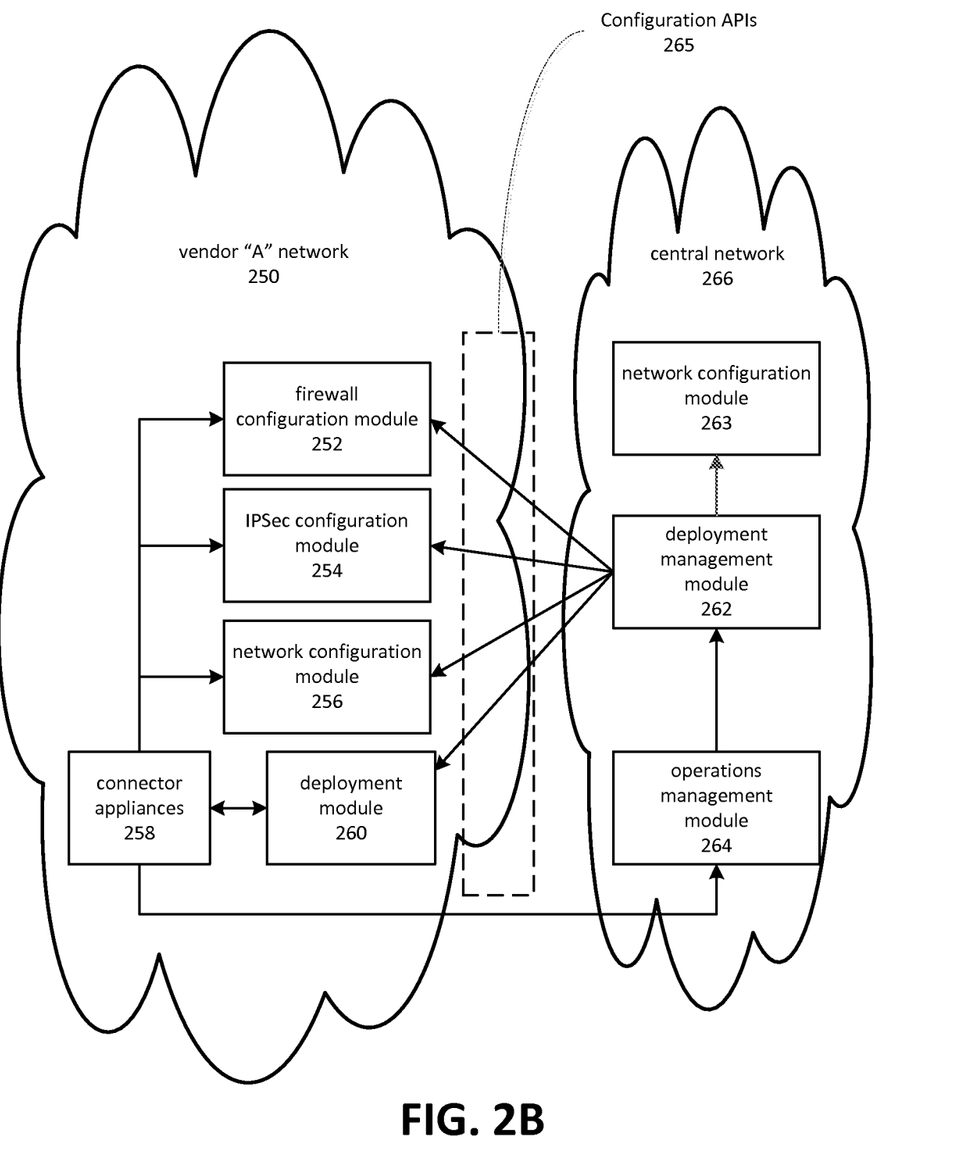
FIG. 2B is a block diagram depicting an example embodiment of a process for configuring a connector appliance deployed to a third-party network.

In some cases and embodiments, additional configuration operations may be performed in order to activate a connector appliance and to perform ongoing adjustment and maintenance of a communications channel between a third-party network and a central network. FIG. 2B is a block diagram depicting an example embodiment of a process for configuring a connector appliance deployed to a third-party network.

Configuration APIs 265 may be utilized to cause a connector appliance 258 to be installed and become operational on a virtual machine host operating within vendor "A" network 250. Configuration APIs 265 are associated with various aspects of configuring a virtual machine on vendor "A" network 250, and on causing the virtual machine to become operation. Various operations may be invoked through Configuration APIs 265, such as those associated with firewall configuration module 252, IPSec configuration module 254, network configuration module 256, and deployment module 260.

In some cases and embodiments, configuration or deployment modules, such as deployment module 260, may be accessible over a public network such as the Internet through Configuration APIs 265. Deployment management module 262 may transmit invocations of various configuration steps via configuration APIs 265. The invocations may be transmitted over the public network to the configuration APIs 265 available on vendor "A" network 250. Configuration APIs 265 may comprise web services, remote procedure calls, or other similar mechanisms for receiving programming interface invocations. By invoking methods of deployment module 260, or the other various configuration APIs 265, deployment management module 262 may cause the instructions related to the operation of connector appliances 258 to become executable on a virtual machine operating within vendor "A" network 250.

As noded, deployment of connector appliances 258 to vendor "A" network 250 may comprise configuration of firewalls, IPSec settings, and networking settings. A deployment management module 262 may operate in central network 266. Requests to perform various configuration operations may be transmitted from deployment management module 262 to management modules operating in vendor "A" network 250. The requests to perform configuration operations may be received by various configuration modules in vendor "A" network 250. These may include firewall configuration module 252, IPSec configuration module 254, network configuration module 256, and deployment module 260. The modules may be associated with externally accessible interfaces, such as a web service interface, URL, and so forth.

IPSec configuration module 254 may receive a message indicating how an IPSec protocol may be established between connector appliances 258 on vendor "A" network 250 and another process operating on central network 266.

In response to receiving the message, IPSec configuration module 254 may cause subsequent IPSec communications channels between vendor "A" network 250 and central network 266 to utilize the altered IPSec configuration.

Network configuration module 256 may receive a message indicating that local network settings should be adjusted. In various cases and embodiments, network configuration module 256 may, in response to receiving the message, cause one or more processes or applications operating on computing nodes connected to vendor "A" network 250 to transmit messages to connector appliances 258, where the messages may then be forwarded to central network 266. In some embodiments, network settings may be configured to cause connector appliances 258 to intercept a subset of messages transmitted over the network associated with vendor "A" network 250 and then forward the messages to central network 266.

In some cases and embodiments, connector appliances 258 may transmit or otherwise initiate configuration operations by firewall configuration module 252, IPSec configuration module 254, and network configuration module 256. This may, for example, be performed by a script that executes when a virtual machine containing connector appliance 258 is activated.

Embodiments may also configure central network 266, through network configuration module 263, to transmit and receive messages from vendor "A" network 250. This may comprise configuration of domain name service entries, IPSec configuration, firewall configuration, and so forth. It may also comprise launching a process to act as a communications endpoint.

In various cases and embodiments, an operations management module 264 may perform monitoring of various operating conditions pertaining to connector appliance 258. For example, operations management module 264 may receive information indicative of the performance of connector appliances 258. Scaling may be achieved, in some cases and embodiments, by operations management module 264 submitting a request, to deployment management module 262, to deploy one or more additional connector appliances 258 to vendor "A" network 250. In some cases, rather than deploying an additional connector appliance to the same network, another network operated by the same vendor or a different vendor may be utilized. An additional connector appliances 258 may then be deployed to the new network, using techniques such as those described here. Embodiments may perform further network configuration, for example by network configuration module 256, to cause load balancing to occur between instances of connector appliances 258. Note that in some cases and embodiments, a virtual machine host operating within vendor "A" network 250 may already possess an appropriately configured virtual machine image. In such cases, additional connector appliances 258 may be created without retransmitting the virtual machine image.

In an embodiment, utilization of one or more deployed and operable connector appliance 258 may be monitored. In response to utilization of the connector appliances exceeding a threshold level, operations management module 264 may determine to contact deployment management module 262 to request that an additional connector appliance be deployed. In a similar fashion, if utilization of connector appliances 258 falls below a threshold level, operations management module 264 may trigger a process for removing one or more of connector appliances 258 from operation.

Figure 3:
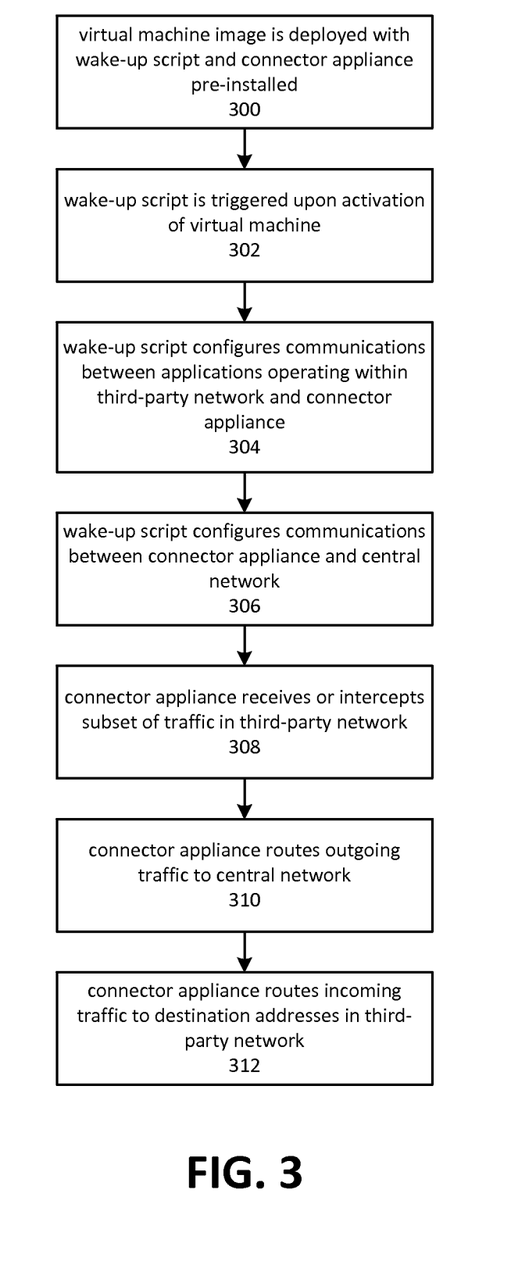
FIG. 3 is a flowchart depicting an embodiment of a process for activating a connector appliance in a third-party network and using the deployed connector appliance to route network traffic between networks.

FIG. 3 is a flowchart depicting an embodiment of a process for activating a connector appliance in a third-party network and using the deployed connector appliance to route network traffic between networks. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

As depicted by element 300, embodiments may deploy a virtual machine image in which a wake-up script and instructions for performing the functions of a connector appliance are pre-installed in the virtual machine image. Deployment of the virtual machine may be coordinated by a process operating on a central network that communicates with a management interface available in a third-party network to transfer and deploy the virtual machine image. In some cases, no such interface may be available in the third-party network. In such cases, embodiments may transmit the virtual machine image to a client, who may then utilize other vendor-specific techniques to cause the virtual machine image to be deployed in the third-party network.

Element 302 depicts triggering a wake-up script upon activation of the virtual machine. A wake-up script may comprise instructions that are executed when a virtual machine based on the virtual machine image is activated. Activation may, for example, occur when a virtual machine host loads a virtual machine image from a storage device and causes the virtual machine's virtual processors to begin executing. In some cases, a script may be executed upon the initial activation of the virtual machine to perform one-time-only configuration, and another script may be executed each time the virtual machine is activated in order to confirm that any necessary configuration steps have been performed.

As depicted by element 304, the wake-up script may configure communication between applications operating within the third-party network and the connector appliance, which may also operate within the third-party network. In some cases and embodiments, a management interface available on the third-party network may be employed to configure applications to transmit messages to the connector appliance. For example, a management interface might be employed to alter a domain-name service entry used by applications to determine a destination address. In other embodiments, a hosts file or similar configuration file might be altered by the wake-up script. In other embodiments, network routing configuration may be altered. Various other mechanisms for routing network traffic to the connector appliance may be employed.

The wake-up script may also, as depicted by element 306, form a communications channel between the connector appliance and a central network. This function may also be performed by the connector appliance, with or without prompting by the wake-up script. A central hub may operate on the central network and serve as an endpoint of the communications channel.

Element 308 depicts the connector appliance receiving or intercepting a subset of network traffic on the third-party network. In some embodiments, a connector appliance may receive the subset of traffic which is to be forwarded to another network. In other embodiments, a connector appliance may receive a larger subset of network traffic, including all available network traffic.

A connector appliance may, as depicted by element 310, forward a subset of network traffic through the communications channel to an endpoint in the central network. The endpoint in the central network may forward the traffic to another destination, including a connector appliance operating in an additional third-party network.

Element 312 depicts the connector routing incoming traffic to destination addresses within the third-party network. As noted, traffic may be sent from a first third-party network to an endpoint in a central network, and then forwarded on to a second third-party network. In other cases, traffic may be sent from a point within the central network to a third-party network.

Figure 4:
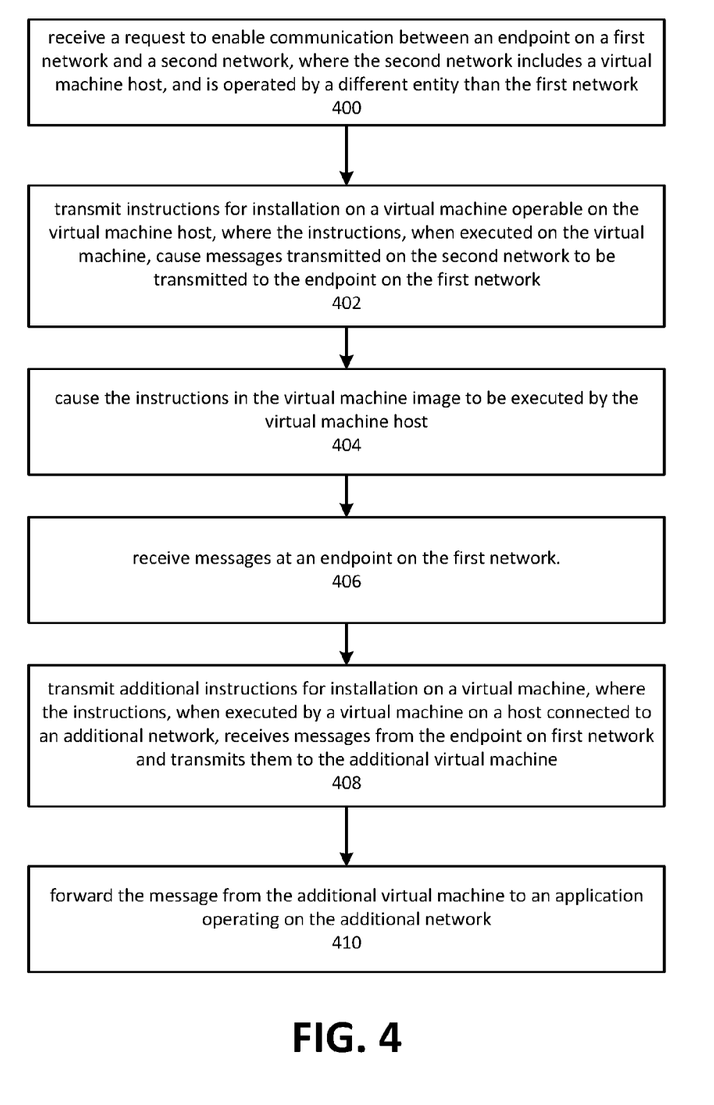
FIG. 4 is a flowchart depicting an embodiment of a process for deploying and operating a cross-network connector appliance.

FIG. 4 is a flowchart depicting an embodiment of a process for deploying and operating a network-connector appliance. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

As depicted by element 400, embodiments may receive a request to enable communication between a first network and a second network. The first network may include a communications endpoint. A communications endpoint may comprise a hardware or software module that receives messages from a connector appliance, and that may also forward messages to other connector appliances.

The second network may include a virtual machine host. The network and the virtual machine host may be operated by a different entity than the first network. For example, an embodiment might operate on the first network, on which it may receive a request to enable communication with the second network, even though the first network is operated by a different organization.

For explanatory purposes, FIG. 4 refers to a first network as a network on which an endpoint may be located, and refers to a second network as a network on which a connector appliance may be located.

Embodiments may, as depicted by element 402, transmit instructions for installation on a virtual machine that is operable on the virtual machine host. The instructions may be compatible with the operating system of the virtual machine and with the second network. The instructions may be installed on the virtual machine prior to, during, or after installation of the virtual machine on the virtual machine host. The instructions, when executed, may cause messages transmitted on the second network to be forwarded or re-transmitted to the endpoint on the first network. The instructions may, for example, comprise means for reconfiguring the virtual machine to function as a bridge between the first and second networks.

Additional instructions may be transmitted for execution on or against various processes executing within the second network. These may comprise configuration interfaces, management interfaces, programming interfaces, and so forth. For example, in some cases and embodiments, a publicly-accessible or customer-accessible interface may be provided by an operator of the second network. The interface may comprise mechanisms for installing and configuring a virtual machine on a virtual machine host on the second network.

Embodiments may receive information about various characteristics of the second network. These characteristics may include information indicating the availability of configuration interfaces on the second network, and if such interfaces are available, the type of interfaces—such as those pertaining to virtual machine installation, network configuration, and so on. The information may also include characteristics about what virtual machine hosts are available on the second network, what format the virtual machine image should conform to, and so on. Embodiments may use this information to identify a set of configuration steps that may need to be invoked in order to configure the virtual machine to execute instructions for connecting the first and second networks.

Embodiments may transmit a virtual machine image that is compatible with the virtual machine host, where the virtual machine image includes instructions that, when executed by the virtual machine host, cause messages transmitted on the second network (i.e., then network on which the virtual machine is connected) to be transmitted to an endpoint on the first network. Embodiments may select the virtual machine image for transmission based on a determination that the virtual machine image comprises instructions for interacting with a management protocol that is available on the first network. Various providers of network services may provide different methods of managing devices and services within a network. Embodiments may maintain machine images corresponding to different providers. When communication with a particular network is requested, embodiments may determine the identity of the provider and identify an image containing instructions that are compatible. For example, the third-party network may have certain mechanisms for configuring network communications. A virtual machine image may be selected because it contains instructions for interacting with those particular mechanisms, because it is pre-configured to be operated within the particular network environment, and so forth.

The selected virtual machine image may include a pre-installed network connector appliance that is compatible with the third-party network to which it will be deployed. In some cases and embodiments, the image may be pre-configured to operate on the third-party network to which it is to be deployed. In other cases, various post-deployment steps may be performed. These steps may, for example, be triggered by instructions performed upon activation of a virtual machine that corresponds to the virtual machine image.

As depicted by element 404, embodiments may cause the instructions on the virtual machine image to be executed. Instructions contained within a virtual machine image may be described as being executed by the virtual machine or as being executed by the virtual machine host. These descriptions may be considered equivalent.

Causing the instructions on the virtual machine image to be executed may comprise various operations, including installing the virtual machine image and causing the virtual machine host to execute the corresponding virtual machine.

A virtual machine image may be transmitted to the third-party network and installed on a virtual machine host. The virtual machine host may then begin executing a virtual machine based on the virtual machine image.

In some embodiments, a virtual machine image may be transmitted to the client that is requesting that communication with a third-party network be established. The client might then perform various operations to load and execute the virtual machine.

As depicted by element 406, embodiments may receive messages at an endpoint on the first network. Execution of the instructions contained within the virtual machine image, such as instructions for performing the operations of a connector appliance, may cause the virtual machine to receive or intercept messages on the second network and forward them to and endpoint on the first network. A secure communications channel may be formed between the connector appliance on the second network and an endpoint on the second network. Communication between the first and second networks may then occur between the connector endpoint on the first network and the connector appliance on the second network.

Network messages transmitted on the first network may be forwarded to the second network. In other words, communication between the two networks may be bi-directional. A message sent on the second network may be received at the communications endpoint, or may be intercepted by the communications endpoint. The endpoint may then forward the message to connector appliance on the first network.

A virtual machine image installed on a virtual machine host on the third-party network may include instructions that, when executed by a virtual machine host, cause a secure communications channel to be opened between the virtual machine and the endpoint on the first network. A secure communications channel may be established through various means, including the use of IPSec, virtual private networks, secure sockets layers ("SSLs"), various encryption mechanisms, and so forth. The virtual machine may be transmitted with pre-configured cryptographic keys enabling the virtual machine to securely communicate with the communications endpoint on the first network.

A virtual machine image installed on a virtual machine host on the third-party network may include instructions in the virtual machine image that, when executed, receive messages and forward them from the connector appliance to applications on the network to which the appliance is connected. Operations performed by the connector appliance may include maintenance of routing tables, state information, connection status, and so forth. This information may be used to appropriately route network traffic.

A virtual machine image installed on a virtual machine host on the third-party network may include instructions in the first virtual machine image that, when executed, perform one or more configuration operations to redirect traffic on the first network to the first virtual machine.

As depicted by element 408, embodiments may retrieve and transmit additional instructions for installation on a virtual machine. The instructions, when executed on a virtual machine hosted by an additional virtual machine host connected to an additional network, cause messages transmitted from the endpoint on the first network to be received by the additional virtual machine on the additional network. The endpoint on the first network may thereby receive message transmitted from connector appliance on the first network and forward them to the connector appliance on the additional network. The converse may also occur. Messages may be transmitted form the connector appliance on the additional network, received by the endpoint on the first network, and forwarded to the connector appliance on the second network. In addition, messages originating on the first network may be forwarded from the endpoint to either or both of the connector appliances. Messages arriving at a connector appliance on the additional virtual machine may then be forwarded to various applications operating on the additional network, as depicted by element 410.

In an embodiment, a system may comprise one or more computing nodes connected to a first network, an endpoint on the first network, a virtual machine comprising instructions for a connector appliance and for configuring the network appliance, and one or more memories having stored thereon computer readable instructions that, upon execution by the one or more computing nodes, cause the system at least to receive a request to enable communication between the endpoint on the first network and a second network connected to a virtual machine host; transmit the virtual machine image for installation on the virtual machine host; and receive a message at the endpoint on the first network, wherein executing the instructions of the virtual machine images causes the message to be forwarded from the second network to the endpoint on the first network.

In another embodiment, a computer-implement method may comprise transmitting, from a first network, a virtual machine image for installation on a virtual machine host connected to a second network, the virtual machine image selected for transmission based at least in part on being compatible with the virtual machine host, the virtual machine image comprising instructions; causing the instructions to be executed by the virtual machine host, wherein the instructions cause a message transmitted on the second network to be forwarded to an endpoint on the first network; and receiving the message at the endpoint on the first network.

In another embodiment, an operator of a network may provide an interface (including both programmatic and graphical user interfaces) for collecting information pertaining to the configuration of another network. The information that may be collected by the interface may include information identifying the operator of the network, characteristics of virtual machines that operate on the network, and so forth.

Embodiments may comprise a first network, such as central network 112 depicted in FIG. 1, that provides an interface for collecting information such as is described in the preceding paragraph. The information may be received, accompanied by additional information indicating that a user requests that communication between the network and a second network be established. The second network may, for example, comprise a private intranet operated by a customer of the first network. A process operating on the first network may supply a virtual machine image with instructions for enabling communication between the first network and the second network. The instructions may include those for extending the configuration of the second network, for configuring the virtual machine on the virtual machine host, and so on. In some cases, however, it may be sufficient to supply a virtual machine image with instructions for causing the corresponding virtual machine to act as a bridge between the first and second network.

Various aspects of the present disclosure may be implemented in various combinations of hardware and/or software that may be referred to as modules. A module may, for example, include computer-executable instructions and computer program products embodied on a non-transitory medium. Modules may also include various hardware components, including but not limited to general-purpose and special-purpose processors, accelerators, routers, bridges, and so forth. A module may also include one or more computing nodes or other devices. The term module may be used to refer to a unit of functionality. For illustrative purposes, aspects of the present disclosure may be depicted as discrete modules. However, it will be appreciated that the various modules depicted herein may be recombined or divided in various ways, and that the depiction of a discrete module should not be viewed as limiting the scope of the present disclosure.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as SQL, while others use application programming interfaces ("APIs") containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives. As used herein, storing data may refer to performing any of various types of operations that involve writing data, such as adding, inserting, changing, and deleting data. The terms "update" and "updating" data may also be viewed as being synonymous with storing data.

Figure 5:
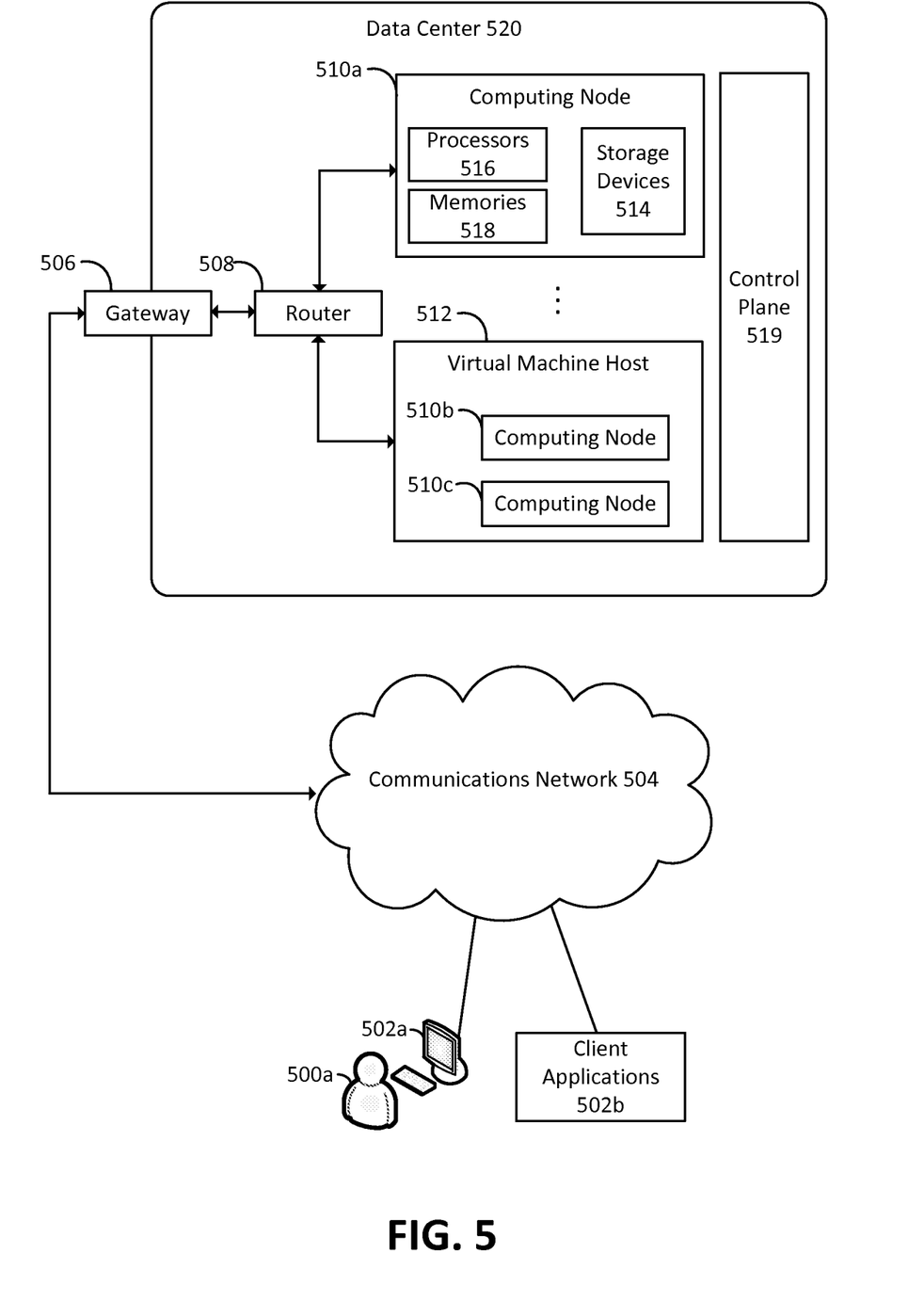
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b, and 510c within a data center 520. Alternatively, client applications 502b may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

A control plane 519 may comprise a computing node configured to coordinate or manage operations of other computing resources in data center 520, such as computing nodes 510a, 510b, and 510c, as well as virtual machine host 512. A control plane 519 may also manage aspects of the configuration and operation of gateway 506 and router 508, as well as various other network components not explicitly depicted in FIG. 5. Embodiments may include an management interface in control plane 519 for managing control functions, such as creating new instances of a computing node, such as computing nodes 510a, 510b, or 510c, adding or configuring a virtual machine host 612, configuring network configuration of router 508, and so on. Embodiments of a control plane 519 may also comprise mechanisms for configuring services or controlling operation of services within data center 520.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
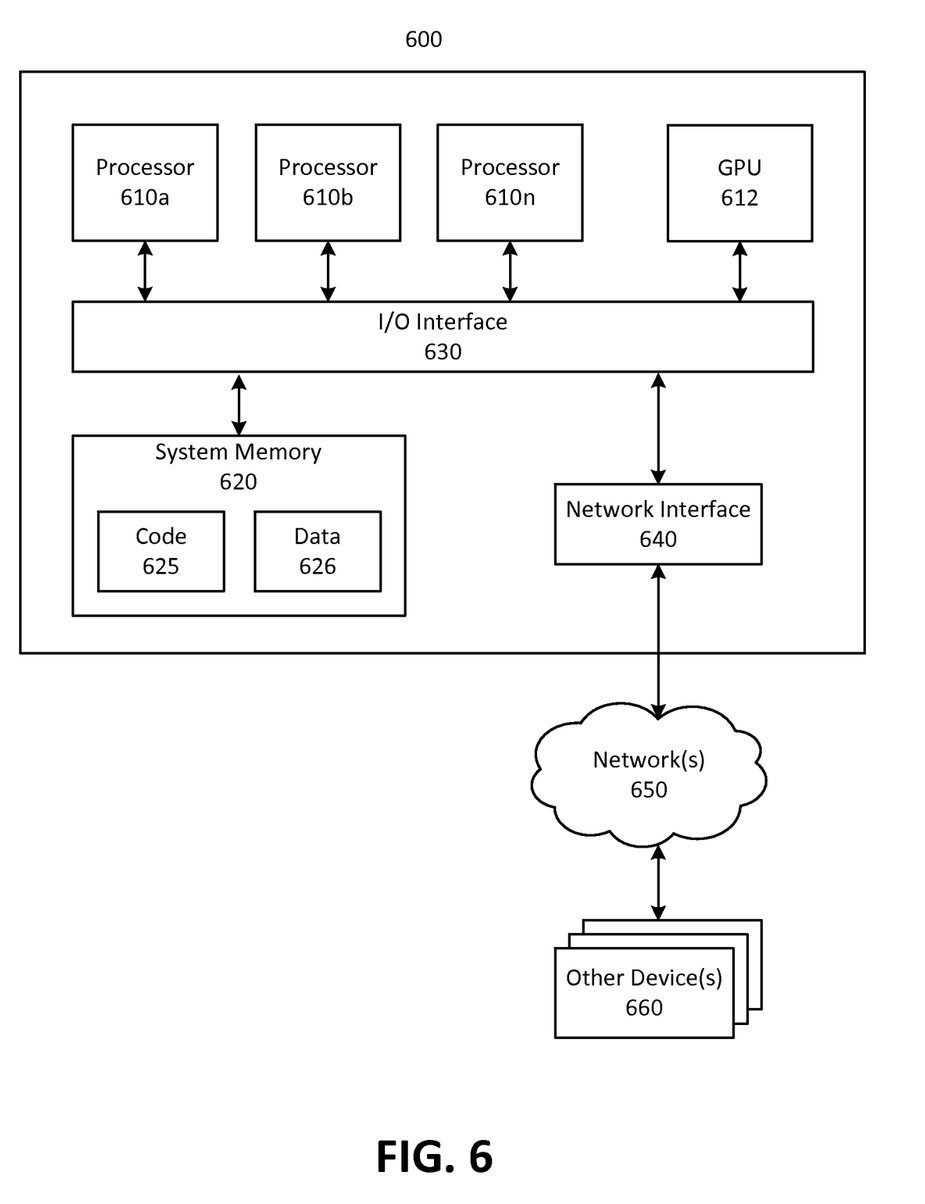
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of network-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of central processing units ("CPUs"), the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
    receive at one or more computing nodes a request to enable communication between a third network and a second network;
    transmitting, from a first network, instructions for execution on a virtual machine by a virtual machine host device connected to the second network, the instructions selected for transmission based at least in part on being compatible with the virtual machine and on being operable, upon execution by the virtual machine, to configure the second network to enable communication with an endpoint on the first network;
    causing the instructions to be executed on the virtual machine, wherein the instructions, when executed, cause a message transmitted on the second network to be forwarded to an endpoint on the first network; and
    receiving the message at the endpoint on the first network wherein executing the instructions causes the message to be forwarded from the second network to the endpoint on the first network for sending to the third network.

2. The method of claim 1, further comprising:
    transmitting a request to install an image of the virtual machine on the virtual machine host device, the image of the virtual machine comprising the instructions.

3. The method of claim 1, further comprising:
    receiving on the first network a request to enable communication between the second network and an additional network, the second network operated by a first entity and the additional network operated by an entity other than the first entity.

4. The method of claim 1, further comprising:
    transmitting, from the first network, additional instructions that, when executed by an additional virtual machine host device on an additional network, cause the message to be received at an additional virtual machine upon the message being forwarded from the endpoint on the first network.

5. The method of claim 1, wherein the instructions, when executed, cause a secure communications channel to be opened between the virtual machine host device and the endpoint on the first network.

6. The method of claim 5, wherein the secure communications channel is opened by at least transmitting Internet Protocol Security (IPSec) messages.

7. The method of claim 1, further comprising:
    transmitting instructions that, when executed on the virtual machine by the virtual machine host device, perform one or more configuration operations to redirect traffic on the second network to the virtual machine.

8. The method of claim 1, further comprising:
    transmitting instructions that, when executed on the virtual machine by the virtual machine host device, perform configuration actions upon activation of the virtual machine.

9. The method of claim 1, wherein causing the instructions to be executable on the virtual machine comprises transmitting, from the first network, an invocation of an application programming interface available on the second network, the application programming interface associated with configuring the virtual machine to execute the instructions.

10. A non-transitory computer-readable storage medium having stored thereon computer-executable data that, upon execution by one or more computing devices, cause the one or more computing devices at least to:
    receive at the one or more computing devices a request to enable communication between a third network and a second network;
    transmit, from a first network, instructions for execution on a virtual machine by a virtual machine host device connected to a second network, the instructions selected for transmission based at least in part on being compatible with the virtual machine and on being operable to cause a message transmitted on the second network to be forwarded to the first network to enable communication with an endpoint on the first network; and
    receive the message at an endpoint on the first network upon based at least in part on execution of the instructions by the virtual machine for sending to the third network.

11. The non-transitory computer-readable storage medium of claim 10, comprising further computer-executable data that, upon execution by the one or more computing devices, cause the one or more computing devices to at least:
    transmit a request to install an image of the virtual machine on the virtual machine host device, the image comprising the instructions.

12. The non-transitory computer-readable storage medium of claim 10, comprising further computer-executable data that, upon execution by the one or more computing devices, cause the one or more computing devices to at least:
    monitor utilization of the virtual machine; and
    cause an additional virtual machine to be activated in response to the utilization being above a threshold level, the additional virtual machine comprising the instructions.

13. The non-transitory computer-readable storage medium of claim 10, comprising further computer-executable data that, upon execution by the one or more computing devices, cause the one or more computing devices to at least:
    transmit additional instructions that, when executed by an additional virtual machine connected to an additional network, cause the message to be received from the endpoint on the first network.

14. The non-transitory computer-readable storage medium of claim 10, comprising further computer-executable data that, upon execution by the one or more computing devices, cause the one or more computing devices to at least:
receive information indicative of a format for an image of the virtual machine; and
transmit the image of the virtual machine, the image comprising the instructions.

15. The non-transitory computer-readable storage medium of claim 10, comprising further computer-executable data that, upon execution by the one or more computing devices, cause the one or more computing devices to at least:
select the instructions for transmitting based at least in part on the instructions being operable to cause the message, upon its transmission on the second network, to be received by the virtual machine executing on the virtual machine host device.

16. The non-transitory computer-readable storage medium of claim 10, wherein the instructions that configure settings of the second network upon activation of the virtual machine.

17. The non-transitory computer-readable storage medium of claim 10, comprising further computer-executable data that, upon execution by the one or more computing devices, cause the one or more computing devices to at least:
receive information indicative of at least one of an identity of an operator of the second network, a format for an image of the virtual machine, or properties of the second network.

18. The non-transitory computer-readable storage medium of claim 10, comprising further computer-executable data that, upon execution by the one or more computing devices, cause the one or more computing devices to at least:
configure the virtual machine to execute the instructions by at least transmitting, from the first network, an invocation of an application programming interface available on the second network.

19. A system comprising:
a first network;
an endpoint connected to the first network;
a computer-readable medium stored external to a virtual machine host device connected to a second network, the computer-readable medium in communication with the first network, the computer-readable medium comprising instructions that, when received by and executed on a virtual machine by the virtual machine host device, configure the second network to communicate with a third network by way of the first network; and
one or more computing nodes connected to the first network, the one or more computing nodes comprising one or more memories having stored thereon computer-executable data that, upon execution by the one or more computing nodes, cause the system at least to:
receive at the one or more computing nodes a request to enable communication between the third network and the second network;
send, in response to the request, the instructions to the virtual machine, the instructions selected for sending based at least in part on the instructions being operable, upon execution, to configure the second network, wherein the sent instructions cause at least a portion of the instructions to be executed on the virtual machine by the virtual machine host device; and
receive a message at the endpoint on the first network, wherein executing the instructions causes the message to be forwarded from the second network to the endpoint on the first network for communication to the third network.

20. The system of claim 19, wherein the instructions, when executed, cause a secure communications channel to be opened between the virtual machine and an endpoint on the first network.

21. The system of claim 19, wherein the one or more memories have stored thereon computer-executable data that, upon execution by the one or more computing nodes, cause the system at least to:
identify one or more configuration steps that, when invoked, configure the virtual machine to execute the instructions.

22. The system of claim 19, wherein the instructions, when executed, cause the virtual machine to receive, via the second network, the message and to transmit the message to the endpoint on the first network.

23. The system of claim 19, wherein the computer-readable medium comprises a virtual machine image, and the virtual machine image comprises the instructions.

\* \* \* \* \*